(12) United States Patent
Lynch et al.

(10) Patent No.: US 6,274,662 B1
(45) Date of Patent: Aug. 14, 2001

(54) VULCANIZABLE ELASTOMERIC COMPOSITIONS CONTAINING SURFACE TREATED BARIUM SULFATE AND VULCANIZATES THEREOF

(75) Inventors: Thomas J. Lynch; Gary M. Freeman, both of Macon, GA (US); Larry R. Evans, Colora, MD (US)

(73) Assignee: J.M. Huber Corporation, Edison, NJ (US)

( * ) Notice: Subject to any disclaimer, the term of this patent is extended or adjusted under 35 U.S.C. 154(b) by 0 days.

(21) Appl. No.: 09/638,953

(22) Filed: Aug. 16, 2000

Related U.S. Application Data

(63) Continuation-in-part of application No. 09/288,903, filed on Apr. 9, 1999, now Pat. No. 6,194,070.

(51) Int. Cl.$^7$ ..................................................... C08K 3/30
(52) U.S. Cl. ........................... 524/423; 523/209; 523/212
(58) Field of Search ............................ 524/423; 523/209, 523/212

(56) References Cited

U.S. PATENT DOCUMENTS

| | | | |
|---|---|---|---|
| 3,944,705 | * 3/1976 | Fujioka et al. ..................... | 428/331 |
| 4,263,051 | 4/1981 | Crawford et al. ................ | 106/308 Q |
| 4,551,497 | 11/1985 | Shinozuka et al. ................ | 524/423 |
| 4,818,614 | 4/1989 | Fukui et al. ........................ | 428/403 |
| 5,227,425 | 7/1993 | Rauline ............................... | 524/493 |
| 5,393,437 | 2/1995 | Bower .................................. | 252/7 |
| 5,401,570 | 3/1995 | Heeks et al. ......................... | 428/332 |
| 5,959,039 | 9/1999 | Yokoyama et al. ................. | 525/236 |

FOREIGN PATENT DOCUMENTS 5-112430   5/1993  (JP) .

OTHER PUBLICATIONS

Japanese Patent Abstract Publ. No. JP05112430, May 1993, Derwent Information Ltd.
RAPRA Journal Abstracts 705689, Erofeev, L., et al., Nanomeric Particles of Barium Sulphate in Toluene as Modifier of Synthetic Rubber, Kauchuk i Rezina (USSR), No. 5, 1995, p. 9–12, RAPRA.
Japanese Patent Abstract Publ. No. JP 02180953, Jul. 1990, Caplus.

* cited by examiner

*Primary Examiner*—Margaret G. Moore
(74) *Attorney, Agent, or Firm*—Carlos Nieves

(57) ABSTRACT

Vulcanizable elastomeric compositions having enhanced dampening properties, among other things, in which the elastomeric composition contains surface-treated barium sulfate particles formed of a plurality of barium sulfate particles and a reaction product of the barium sulfate and silicon-hydride containing polysiloxane integrally located on the surfaces of the barium sulfate particles. Vulcanized products thereof are also encompassed. The elastomeric compositions of this invention can be vulcanized to retain appropriate shapes to provide tire parts (e.g., treads), v-belts, conveyor belts, sealants, shoe parts, and so forth, having enhanced vibration and noise dampening attributes, but without adversely impacting other performance-related properties of the rubber products.

18 Claims, No Drawings

VULCANIZABLE ELASTOMERIC COMPOSITIONS CONTAINING SURFACE TREATED BARIUM SULFATE AND VULCANIZATES THEREOF

CROSS REFERENCES TO RELATED APPLICATIONS

This application is a continuation-in-part of U.S. patent application Ser. No. 09/288,903, filed Apr. 9, 1999, now U.S. Pat. No. 6,194,070.

TECHNICAL FIELD

This invention relates to vulcanizable elastomeric compositions containing surface treated barium sulfate and vulcanizates obtained therefrom, and, more particularly, to a vulcanized elastomeric product, such as a tire, containing a unique surface treated barium sulfate product that offers enhanced dampening properties among other things.

BACKGROUND OF THE INVENTION

Natural barium sulfate (also commonly referred to as barite or barytes) is frequently used as an extender pigment and/or filler due to its chemical inertness (in both acid and alkali environments), high refractive index, low abrasiveness, low oil absorption, and resistance to corrosion. Barium sulfate is also known to promote flame retardancy and smoke suppression in polymeric end use applications. Given their high refractive index, barium sulfates of high brightness are desirable to use as a replacement for titanium dioxide ($TiO_2$) in certain compositions such as pigmented polymeric compounds. Barite can be utilized to replace a portion of the more expensive $TiO_2$ pigment without having a deleterious impact on the compound's brightness and whiteness properties. Synthetic, precipitated barium sulfate pigments are used in a like fashion, but are typically available in finer particle size grades versus the mechanically ground, natural barites. Precipitated barium sulfate is commonly referred to as blanc fixe.

Despite barium sulfate's many end use advantages, it is not readily wetted or dispersed in organic based formulations such as polymeric compounds given its inert inorganic surface. Accordingly, lengthy processing times are typically required to obtain desired levels of dispersibility of the barite in such compounds. Further, fine and ultrafine particle barites in dry form tend to cake when stored and/or transported. Caking creates processing problems when the barite particles are added to end use formulations via automated dry feeders and the like. Consequently, a general need for barium sulfite with improved processability and dispersibility has existed.

In the vulcanized rubber product fields, fillers have been used to stiffen or reinforce rubber and/or reduce the cost of the rubber formulations, such used as in tires, v-belts, hoses, and so forth. Fillers used in for rubber tire components, for instance, have primarily involved carbon black and/or silicas. Besides, silicas, other non-carbon black fillers for tire rubbers also have been mentioned in the prior art, including calcium silicate, aluminum silicate, clay, talc, calcium carbonate, magnesium carbonate, alumina hydrate, diatomaceous earth, barium sulfate, mica, alumina sulfate and titanium oxide (e.g., see U.S. Pat. No. 5,959,039). Vulcanized rubber applications would be advanced if rubber fillers, which implicitly must be compatible with vulcanizable rubber formulations, could be developed which would enhance the vibration and/or noise dampening properties of the end product without causing a sacrifice of the performance needed in other respects, such as in abrasion/cutting/wear resistance, grip (if applicable), flexibility, rolling resistance (if applicable), and/or manufacturability.

SUMMARY OF THE INVENTION

The above and other objectives are fully met by the present invention, which is directed to vulcanizable elastomeric compositions having enhanced dampening properties, among other things, in which the elastomeric composition contains surface-treated barium sulfate particles formed of a plurality of barium sulfate particles and a reaction product of the barium sulfate and silicon-hydride containing polysiloxane integrally located on the surfaces of the barium sulfate particles. The invention also covers the vulcanized products thereof. The inventive elastomeric compositions can be vulcanized to retain appropriate shapes to provide tire parts (e.g., treads), v-belts, conveyor belts, sealants, shoe parts, and so forth, having enhanced vibration and noise dampening attributes, but without adversely impacting other performance-related properties of the rubber products.

DETAILED DESCRIPTION OF PREFERRED EMBODIMENTS

In accordance with the preceding summary, the present invention is directed toward a surface treated barium sulfate product having excellent dispersibility in vulcanizable elastomeric compositions, resulting in reduced processing times and yielding elastomeric products having improved dampening attributes, such as vibration and/or noise dampening. The surface-treated barium sulfate can be made by mixing a linear and non-crosslinked silicon-hydride containing polysiloxane as described herein, in neat or in aqueous emulsion form, with a quantity of barium sulfate particles and then optionally drying the resultant mixture. The silicon-hydride containing polysiloxane is then directly deposited on and chemically bonded to the surface of the barium sulfate particles to form a barium sulfate/ silicon-hydride containing polysiloxane reaction product integrally on the surfaces of the barium sulfate particles. Thereafter, the surface treated barium sulfate particles are incorporated into and dispersed within an elastomeric composition before it is cured.

The elastomers used in this invention are rubbers such as polyisoprene (natural rubber), polybutadiene, polychloroprene, polyisobutylene, styrene-butadiene rubber, acrylonitrile-butadiene, terpolymers of ethylene/propylene/non-conjugated dienes (EPDM), ethylene-vinylacetate copolymer, ethylene-propylene, chlorobutadiene, chlorinated polyethylene, chlorosulfonated polyethylene and ethylene-acrylate copolymer, as used singly or in blends thereof. Diene-based rubbers, copolymers of diene-based rubbers with other prepolymers, and blends thereof, are preferred for tire rubber applications encompassed by this invention. The diene rubbers preferably are conjugated dienes having 1,3 or 1,4 bonds. An exemplary rubber blend, especially for tire tread applications, is (a) styrene-butadiene rubber and (b) polybutadiene rubber. Rubber components (a) and (b) generally can have a mixing ratio of approximately 60–80/40–20 wt %/wt %, respectively, for tire tread rubber implementations of the invention. The above-listed rubbers, once combined in the elastomeric compositions with the surface treated barium sulfate described herein and other ingredients, are vulcanized, i.e., cured by formation of chemical cross-links between high molecular weight linear molecules of the base rubber material(s). Curing of elastomers used in elastomeric compositions according to this invention can proceed along conventional lines using sulfur-based chemical systems, and/or by using organic peroxide catalyzed systems.

In addition to the surface-treated barium sulfate additive of this invention, elastomeric compositions of this invention typically also contain conventional rubber adjuvants and additives such as antioxidants, antiozonants, oil extenders and other processing aids, stiffening fillers, pigments, and/or reinforcing fillers, added in conventional respective amounts. For instance, sulfur is a known curing agent for rubbers, but acts too slowly by itself at most practical temperatures, so combinations of accelerators and activators including sulfur are often used. Examples of accelerators in this regard include diphenyl guanidine, hexamethylamine tetramine, mercaptobenzothiazole disulfide, tetramethylthiuram disulfide, zinc diethyl dithiocarbamate, sulfenamides, and so forth. Common activators include stearic acid and zinc oxide. Protective agents used to suppress or reduce the deteriorating effects of oxygen and ozone on the rubber include alkyl paraphenyl diamines and phenyl β-naphthylamine. As reinforcing fillers, carbon black and silica can be used, while useful non-reinforcing fillers include clay, calcium carbonate and so forth. Fluids used to soften the rubber or reduce the stiffness of the rubber include paraffin waxes and mineral oils.

One exemplary elastomeric formulation of this invention includes, styrene-butadiene rubber (e.g., solution polymerized SBR), polybutadiene rubber (PB), the surface-treated barium sulfate, antiozonant, fatty acid, wax, filler, metal oxide, coupling agent, process oil, vulcanizer, and accelerator. These components are compounded to obtain elastomeric mixtures suitable for vulcanization into practical elastomeric products. The elastomers of this invention are especially well-suited for tire rubber applications, such as tire treads and pneumatic tire treads in particular, where noise and vibration dampening is desired without sacrificing good wear resistance, low rolling resistance, good grip, and so forth. However, the elastomeric compositions described herein also could be used in other applications in which vulcanizable rubber formulations are commonly used, such as in the manufacture of conveyor belts, v-belts, footwear soles, hoses, grip pads, and sealants. The elastomeric formulations of this invention can be shaped into the desired article using conventional and otherwise suitable extrusion, molding, and casting techniques, that one familiar with tire-making, rubber belt-making, or hose-making will be aware of, as applicable.

Again, in this invention, vulcanizable elastomers are combined with barium sulfate particles that have been surface treated as described herein to provide elastomeric compositions. Other additives can be added to the elastomeric composition to tailor the properties of the composition to best suit the end application envisaged. Preferably, the surface treated barum sulfate particles are sufficiently mixed with the elastomeric rubber ingredients and any other non-elastomeric ingredients of the overall composition to be vulcanized to provide an essentially uniform dispersion of the barium sulfate particles throughout the elastomeric composition. In one preferred embodiment, the surface treated barium sulfate particles are provided such that a dry ground natural barite is subsequently surface treated before it is incorporated into an elastomer formulation. However, it should be noted that precipitated barium sulfates or wet ground barites can also be surface treated by the inventive method to yield similar benefits. Table I sets forth some mineral properties of a typical dry ground barium sulfate. Table II sets forth some physical properties of four different, dry ground barite products available as Huberbrite® from J. M. Huber Corporation.

TABLE I

Mineral Properties

| | |
|---|---|
| Morphology | Blocky |
| Refractive Index | 1.64 |
| Specific Gravity | 4.50 |
| Mohs Hardness | 3.0–3.5 |
| Linear Coefficient of Expansion ($10^{-6}/°$ C.) | 10 |
| Solubility (g/100 ml) | 0.00025 |
| Dielectric Constant | 11.4 |
| Bulking Value (gal/lb) | 0.027 |

TABLE II

| | Huberbrite ® 1 | Huberbrite ® 3 | Huberbrite ® 7 | Huberbrite ® 10 |
|---|---|---|---|---|
| General Specifications | | | | |
| Moisture, 105° C. (max), % | 0.20 | 0.10 | 0.10 | 0.10 |
| Screen residue; 325 mesh (max), % | 0.05 | 0.005 | 0.01 | 0.6 |
| pH (100 g/250 ml $H_2O$) | 8.5–9.5 | 8.5–9.5 | 8.5–9.5 | 8.5–9.5 |
| Dry brightness, % reflectance | 94 | 94 | 94 | 93 |
| Hegman Grind | 6.5 | 6 | 4 | 3 |
| Typical Physical Properties | | | | |
| Form | Fine Powder | Fine Powder | Fine Powder | Fine Powder |
| Avg. Stokes equiv. particle diameter, microns | 1.1 | 3.0 | 6.5 | 8.5 |
| Median particle size, LLS, microns | 0.9 | 2.1 | 5.8 | 8.1 |

TABLE II-continued

|  | Huberbrite ® 1 | Huberbrite ® 3 | Huberbrite ® 7 | Huberbrite ® 10 |
|---|---|---|---|---|
| Surface area, BET (m²/g) | 3.6 | 1.4 | 0.6 | 0.5 |
| Oil absorption (g/100 g) | 12 | 12 | 12 | 11 |
| Bulk density, loose (lb/ft³) | 60 | 80 | 90 | 100 |
| Bulk density, tapped (lb/ft³) | 90 | 110 | 120 | 130 |

The physical and chemical data reported herein were determined as follows. Specific gravities were determined by helium gas displacement using a Quantachrome 1000 automated pycnometer unit. The moisture content on the barite in wt. % was determined by drying test samples in a forced air oven at 105 deg. C. for approximately 2 hours in accordance with the TAPPI Method T671 cm-85 procedure. Screen residue values for an untreated barite were measured by pouring a well-mixed slurry of the barite through a 325 mesh screen, rinsing, drying and weighing the residue, following the ASTM D-185 procedure. Barite pH values were determined using a standard pH meter on a 28% solids (by weight) mixture of the barite with deionized water in accordance with the ASTM D-1208, E-70 procedure. Dry pigment brightness values in Table II were measured at 530 nm with a magnesium oxide standard equal to 100%, following the ASTM C-110 procedure. The whiteness index and % brightness values are standard TAPPI brightness numbers as determined by reading the PVC test plaques with a Technidyne Micro TB-1C brightness meter in accordance with the TAPPI Method T646 om-86 procedure. Hegman grind values were determined by dispersion and subsequent draw down of the products in an alkyd oil, such as Aroplaz 1266 M70, following the standard ASTM D-1210 procedure. The average Stokes equivalent particle diameters in microns were determined by an x-ray sedimentation method based on Stokes Law using a Micromeritics 5100 Sedigraph particle size instrument. The average Stokes equivalent particle diameter is the median particle size (MPS) value determined by the x-ray Sedigraph. The median particle size values, measured by the laser light scattering (LLS) method and reported in microns, were determined using a Malvern Mastersizer/E instrument which is based on Fraunhofer diffraction as generally described in U.S. Pat. No. 5,167,707, incorporated herein by reference, and references cited therein. BET surface areas were determined by the nitrogen absorption method described by Brunauer, Emett, and Teller in the "Journal of the American Chemical Society," Volume 60, page 309, published in 1938. A multi-point surface area determination was made on the barite test samples after outgassing them at 130 deg. C. using a Micromeritics Gemini III 2375 instrument. Oil absorbance values were determined from the grams of linseed oil absorbed per 100 grams of pigment by the rub-out method of ASTM-D.281. Loose and tapped bulk densities were determined by the procedures described in ASTM D-1895.

In the preferred embodiment, Huberbrite® 1 barium sulfate is surface treated in accordance with the method of the present invention. The fine particle size of Huberbrite®1 barium sulfate is well suited when utilized in elastomeric compounds since the fineness of the particles is important to the resultant physical properties and/or effective spacing of the titanium dioxide pigment. When the exterior surfaces of the barium sulfate particles are directly contacted with the hydrogen reactive polysiloxane, the hydrogen reactive polysiloxane directly attaches to the surface of the barium sulfate particles and bonds to this surface through means of a chemical reaction involving its reactive Si—H groups. The active treatment agent, i.e., the hydrogen reactive polysiloxane, is not co-polymerized or cross-linked prior to being used to directly surface treat the barium sulfate particles. The silicon-hydride containing polysiloxane active agent is used in homopolymer form. The treatment level of the silicon-hydride containing polysiloxane can range from about 0.1% to about 2.0% by weight, but is preferably from about 0.5% to about 1.5% by weight, based on the weight of the barium sulfate.

The ground barite is directly surface modified with a hydrogen reactive silicone fluid (commonly referred to as a H-siloxane, a hydrogen reactive polysiloxane, or a silicon-hydride containing polysiloxane). The presence of the reactive silicon-hydride (Si—H) groups is essential to the siloxane's effectiveness as a surface treatment agent for the barite. A preferred H-siloxane fluid utilized for surface modification of barium sulfate is a methyl hydrogen polysiloxane (denoted hereafter as Me H polysiloxane). Me H polysiloxanes of low molecular weight (MW<10,000) are particularly preferred as treatment agents. It should be noted that other alkyl hydrogen polysiloxanes and siloxanes of lower reactive hydrogen content can also be utilized.

An illustrative example of the chemical structure of a linear, non-crosslinked silicon-hydride containing polysiloxane homopolymer useful in preparing the surface treated barite products of this invention is set forth immediately below in general formula A:

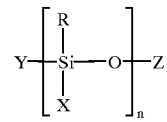

wherein:
n represents a positive integer greater than 1, and preferably is in the range of about 10 to about 250;
X can represent H or R', with the proviso that at least one X in general formula A is H, and, in general, at least about 10% of all X's in general formula A represent H, and, more preferably, at least about 50% or more of all X's in general formula A represent H (if the % of H's is too low, the polysiloxane may not bond effectively to the barium sulfate surface);
R and R' each represents an organic substituent comprising 1 to 20 carbon atoms, and the various R and R' groups present can be the same or different within this definition, and where each R and R' preferably and independently is chosen from alkyl, aryl (e.g., phenyl), and aralkyl, and each R and R' also can be a substituted or a nonsubstituted group; and Y and Z each represents a silicon-containing terminating end group. As apparent from this definition for general formula A, the various silicon atoms in the backbone of the polysiloxane can have the same or different pair of respective side groups from one silicon atom to the next along the backbone as long as X falls within the definition provided above, including the requirement that at least one X present is a H. For example, the polysiloxane can include a plurality of alkyl hydrogen siloxanyl units in the polymeric chain as well as one or more dialkyl (e.g., dimethyl) siloxanyl units along the chain. Preferably, the alkyl hydrogen siloxanyl units are distributed substantially equidistantly along the polymeric chain.

In a preferred embodiment where the silicon-hydride containing polysiloxane used for surface treatment is an alkyl hydrogen polysiloxane (i.e., R=alkyl, X=H), then, with reference to the above chemical structure of general formula A, polysiloxanes are preferred having the following definitions:

n represents an integer greater than 1, and preferably is in the range of about 10 to about 250;

X represents H;

R represents a $C_1$–$C_{20}$ alkyl group, where all R groups can be the same or different, and each R can be substituted or nonsubstituted; and Y and Z each represent silicon-containing terminating end groups.

In an even more preferred embodiment where the silicon-hydride containing polysiloxane used for surface treatment is a linear, non-crosslinked methyl hydrogen (Me H) polysiloxane homopolymer of low molecular weight, then in reference to the above chemical structure of general formula A, polysiloxanes are more preferred having the following definitions:

n represents an integer between about 30 to about 100;

X represents H;

R represents methyl;

Y represents $(CH_3)_3SiO$—; and

Z represents —$Si(CH_3)_3$.

The surface treated barite employed as an elastomeric rubber additive of the present invention is prepared by treating either dry, finely divided barite powder or a barite slurry with the H-reactive silicone fluid. Effective surface treatments on the barium sulfate particles can be carried out on either physical form (dry or slurry) by using a neat H-siloxane fluid or by adding an aqueous emulsion of the H-siloxane fluid as more fully described below. Initially, 98 to 99.9 parts by weight of a quantity of barium sulfate (e.g., Huberbrite® 1 barium sulfate) is added to a solids/liquid batch blender. The blender is turned on and 0.1 to 2.0 parts by weight (on an active basis) of the Me H polysiloxane is added respectively over approximately 0.1 to 3 minutes so as to yield a total of 100 parts by weight. The total mixing time is preferably 5 to 40 minutes. The preferred treatment level of the Me H polysiloxane is from about 0.5% to about 1.5% by weight. Optionally, the barite may be heated during the dry treatment and subsequent mixing steps. In the case of surface treating a dry barite powder with Me H polysiloxane at room temperature, the treated barite product should be allowed to sit for a period of about 24–48 hours prior to its use to insure that the surface reaction is complete. Increasing treated product hydrophobicity and small amounts of $H_2$ gas evolution are typically observed over this time period.

Alternatively, the dry treatment process can be carried out continuously by adding the H-siloxane (neat or as an aqueous emulsion) via a chemical metering pump that is used in combination with a pin mixer, a Bepex turbulizer unit or a similar continuous blending device. If a barite starting material is to be treated in slurry form, the Me H polysiloxane is added slowly to the slurry with good mixing and then mixed for an additional 5 to 30 minutes. The treated barite slurry is then vacuum filtered and subsequently oven dried or flash-dried under conventional drying conditions. Whether surface treated in dry particulate form or in slurry form followed by drying, the treated barite product can be optionally post-pulverized to reduce treated particle agglomeration thereby improving its degree of particle fineness as measured by its resultant Hegman grind properties.

In an alternative method, an aqueous emulsion of a Me H polysiloxane is used to surface treat the barium sulfate. The aqueous emulsion is preferably prepared from a high-speed dispersion of the Me H polysiloxane in water in the presence of a surfactant. In a preferred embodiment, the aqueous emulsion comprises Me H polysiloxane in an amount of from about 30% to about 70%, and a nonionic surfactant in an amount of from about 1.0% to about 3.0% of the total formulation (percentages are on an active weight basis).

It has been found that the optimum amount of nonionic surfactant used in preparing the emulsion formulation described above is about 4.0% by weight of the H-siloxane component. Further, preferred nonionic surfactants have a hydrophilic lypophilic balance (HLB) value of greater than 9. A nonionic surfactant particularly suited for emulsifying the Me H polysiloxane is a polysorbitan monolaurate with 20 moles of ethoxylation available under the trade name Alkamuls PSML-20 from Rhodia. In order to obtain sufficient stability, the emulsions are optimally prepared at a 50% by weight concentration of Me H polysiloxane whereby the corresponding weight concentration of Alkamuls PSML-20 utilized therein would optimally be 2%.

Table III sets forth some variable physical properties of the treated barium sulfate product that was produced by surface treating Huberbrite® 1 barium sulfate with 1% by weight of the preferred Me H polysiloxane.

TABLE III

| | Treated Barium Sulfate |
|---|---|
| General Specifications | |
| Moisture, 105° C. (max), % | 0.5 |
| Screen Residue*, 325 mesh (max), % | 0.1 |
| Hegman Grind | 4–7 |
| Typical Physical Properties | |
| Form | Fine Powder |
| bulk density, loose (lb/ft$^3$) | 50–60 |
| bulk density, tamped (lb/ft$^3$) | 76–80 |

*Given their very hydrophobic nature, a modified test procedure was used for determining the % screen residue of a treated barite product, as follows: Using 100.0 grams of pigment, a 38% solids dispersion in ethanol was produced and poured through a 325 mesh sieve screen. After washing with an additional 100 gm quantity of ethanol, the residue was dried, collected and then weighed.

Table IV lists a number of barite test samples and their corresponding descriptions.

TABLE IV

| Sample | Descriptions |
|---|---|
| A | 1 micron MPS, dry ground barite[1] |
| B | 1 micron MPS, dry ground barite[1] treated with 1.0% Me H polysiloxane[2] (neat addition) |
| C | 1 micron MPS, dry ground barite[1] treated with 1.0% Me H polysiloxane[2] (added as an emulsion) |
| D | 1 micron MPS, dry ground barite[1] treated with 1.0% isostearic acid[3] (neat addition) |
| E | 1 micron MPS, dry ground barite[1] treated with 1.0% dimethyl siloxane, hydroxy terminated (neat addition)[4] |
| F | 1 micron MPS, dry ground barite[1] treated with 1.0% Si-H functional alkyl siloxane[5] (neat addition) |
| G | 1 micron MPS, dry ground barite[1] treated with 1.0% phenyltrimethoxysilane[6] |
| H | 1 micron MPS, dry ground barite[1] treated with 1.0% isobutyltrimethoxysilane[7] |

[1]Huberbrite ® 1 barium sulfate available from J. M. Huber Corporation
[2]Me H polysiloxane available from Dow Corning under the trade name Silicone Fluid 1107, having an "n" value as defined herein of about 50 to about 80, and MW of about 2400–3700
[3]Isostearic Acid available from Henkel Corporation under the trade name Emery 873
[4]Dimethyl siloxane available from Dow Corning under the trade name Silicone Fluid 4-2797
[5]Alkyl siloxane available from Dow Corning under the trade name Silicone Fluid 2-5084 (contained about 50% less Si-H content than Dow Corning Silicone Fluid No. 1107)
[6]Phenyltrimethoxysilane available from Sivento Inc.
[7]Isobutyltrimethoxysilane available from Sivento Inc.

EXAMPLE 1

In this example the performance of Sample C of Table IV, a surface treated barite, was compared to that of Sample A, an untreated barite, each in an elastomeric compound. This elastomeric composition is formulated to serve as a tire tread formulation, as described in Table V. Formulation ingredients were combined in a 1.5 liter Banbury mixer in three passes. The rubber formulation labeled "Treated Barite" in Table V is representative of the present invention, per Example C of Table IV. The comparative rubber formulation is labeled "Untreated Barite" in Table V.

TABLE V

| Rubber Formulations | Untreated Barite (Sample A) | Treated Barite (Sample C) |
|---|---|---|
| Pass 1 | | |
| JSR SL-574[1] | 75.0 phr | 75.0 phr |
| CB-11 BR[2] | 25.0 | 25.0 |
| Santoflex 13[3] | 0.5 | 0.5 |
| Stearic Acid[4] | 1.0 | 1.0 |
| Wax[5] | 1.4 | 1.4 |
| Pass 2 | | |
| Untreated Barite | 180.0 | — |
| Treated Barite | — | 180.0 |
| Zinc Oxide | 2.5 | 2.5 |
| X50S[7] | 12.8 | 12.8 |
| Sundex 8125[8] | 32.5 | 32.5 |
| Santoflex 13 | 1.5 | 1.5 |
| Pass 3 | | |
| Sulfur[9] | 1.7 | 1.7 |
| TBBS Accelerator[10] | 1.7 | 1.7 |
| DPG Accelerator[11] | 2.0 | 2.0 |
| TOTAL PHR | 337.6 | 337.6 |

[1]JSR SL-574 is a solution-polymerized styrene butadiene rubber from Japan Synthetic Rubber Co., LTD. The SL-574 has 57% vinyl and 15% styrene with a mooney viscosity of 64. This was purchased through JSR America Inc. New York, N.Y.
[2]The CB-11 is a polybutadiene rubber from Bunawerke Huels GmbH, Germany. This rubber can be substituted with other commercially available polybutadienes, such as Cisdene 1203 from American Synthetic Rubber of Louisville, KY. Its make-up is 93% cis 1,4-polybutadiene with a 45 mooney viscosity value.
[3]The Santoflex 13 was Flexzone-7P from Uniroyal, both chemically are "N-1,3 dimethyl butyl-N'-phenyl-p-phenylenediamine". This is an antiozonant.
[4]Stearic Acid was Emery 400 distributed by C. P. Hall.
[5]The wax used was OKERIN 7240H from Sovereign.
[6]Kadox 720, a zinc oxide obtained from Zinc Corp.
[7]X50S is 50% Si69 coupling agent on 50% N330 carbon balck, manufactured by Degussa and distributed through R. T. Vanderbilt.
[8]Sundex 8125 is an aromatic oil from Sunoco distributed by R. E. Carroll.
[9]The sulfur was "Rubbermakers" brand sulfur.
[10]The TBBS was "N-t-butyl-2-benzothiazole sulfenamide" from different sources, viz., Santocure NS (Monsanto) and Delac NS (Uniroyal).
[11]The DPG was "Diphenylguanidine", obtained from Monsanto.

The above-composition of Table V, after mixing, was run on a Monsanto R-100 oscillating disk rheometer cure meter according to ASTM D2084 at 165.6° C. (330° F.), 3° arc. The T90 time obtained from this meter was used to perform the rest of the test methods. Test pieces were made in different molds and cured in a press for the time and temperature stated for each test method. Elastomer performance data was measured on resulting vulcanized elastomeric product, and the results are reported in Table VI below. The various categories of tests performed on the rubber samples are indicated in bold print followed by the properties measured under each respective category.

TABLE VI

Elastomer Properties

| Rubber Formulations | Untreated Barite (Sample A) | Treated Barite (Sample C) |
|---|---|---|
| Rheometer @ 165.6° C. 3° arc | | |
| minimum torque (in-lbs.) | 3.1 | 3.5 |
| maximum torque (in-lbs.) | 52.0 | 58.0 |
| delta torque | 48.9 | 54.5 |
| M50 (in-lbs.) | 27.6 | 30.8 |
| M90 (in-lbs.) | 47.1 | 52.6 |
| ts2 (min) | 2.5 | 2.3 |
| T50 (min) | 4.5 | 4.3 |
| T90 (min) | 12.0 | 11.5 |
| cure rate index (min.−1) | 10.5 | 10.8 |
| ML/1 + 4/100° C. (mu, Mooney)[1] | 28.3 | 20.9 |
| Shore A Hardness[2] | 52 | 55 |
| Rex Hardness[2] | 48 | 52 |
| Zwick Rebound; Cured: T90 + 10 mins., @ 165.6° C.[3] | | |
| Room Temp (20° C.), % | 59.4 | 60.8 |
| Tensile Modulus; Cured: T90 + 5 mins. @ 165.6° C.[4] | | |
| M 10%, MPa | 0.5 | 0.6 |
| M 50%, MPa | 0.7 | 0.9 |
| M100%, MPa | 0.8 | 1.2 |

TABLE VI-continued

Elastomer Properties

| Rubber Formulations | Untreated Barite (Sample A) | Treated Barite (Sample C) |
| --- | --- | --- |
| M200%, MPa | 1.1 | 1.9 |
| M300%, MPa | 1.5 | 2.9 |
| Tensile Break, MPa | 2.8 | 4.2 |
| % Elongation @ Break | 439 | 398 |
| Modulus Ratio[4] | | |
| 200%/50% Modulus Ratio (avg.) | 152% | 210% |
| 300%/100% Modulus Ratio (avg.) | 186% | 244% |
| Crescent Tear: Die C; Cured: T90 + 5 mins. @ 165.6° C.[5] | | |
| Force (N/cm) | 119 | 176 |

[1]Mooney viscosity according to ASTM D-1646, part A
[2]Hardness using a Type A Durometer according to ASTM D2240
[3]Rebound using Zwick 5109 according to DIN53512/IS0 4662
[4]Tensile modulus using a Sintech 5/D according to ASTM D412, Method A, dumbbell shape
[5]Crescent Tear-Die C using a Sintech 5/D according to ASTM D 624

As indicated by the results in Table VI, the surface treated barite provides a elastomeric product filled with it with higher rheometer torque values, which indicate higher reinforcement. The surface treated barite also gave the elastomeric composition a considerably lower Mooney viscosity (−26%), which significantly improves elastomer processing. All modulus values were increased with the presence of the surface treated barite. For example, the 300% modulus was almost doubled (93% increase). The tensile strength was increased by 50% by incorporating the surface treated barite in lieu of untreated barite. Elongation was decreased slightly due to higher modulus. Importantly though, the energy-to-break, as estimated by the product of tensile break and elongation, was increased by 36%. Modulus ratios (avg. +34%) and tear (48%) were both improved by including the surface treated barium sulfate additive in the elastomeric composition, further indicating improved barite-polymer interaction and reinforcement. Taken together, these data demonstrated the large processing and reinforcement improvements gained by elastomeric compositions by the presence therein of the surface treated barite (barium sulfate) over untreated barite.

The present invention may be embodied in other specific forms without departing from the spirit or essential attributes thereof and accordingly reference should be made to the appended claims rather than the foregoing specification as indicating the scope of the invention.

What is claimed is:

1. An elastomeric composition comprising:
a vulcanizable or vulcanized rubber;
a surface treated barium sulfate product dispersed in said rubber, said surface treated barium sulfate comprising a plurality of barium sulfate particles having surfaces and a reaction product of barium sulfate and silicon-hydride containing polysiloxane integrally located on the surfaces of the barium sulfate particles; and
sulfur and at least one curing accelerator.

2. The elastomeric composition of claim 1 wherein said rubber includes at least one rubber selected from the group consisting of polyisoprene (natural rubber), polybutadiene, polychloroprene, polyisobutylene, styrene-butadiene rubber, acrylonitrile-butadiene, terpolymers of ethylene/propylene/non-conjugated dienes (EPDM), ethylene-vinylacetate copolymer, ethylene-propylene, chlorobutadiene, chlorinated polyethylene, chlorosulfonated polyethylene and ethylene-acrylate copolymer.

3. The elastomeric composition of claim 1 wherein said rubber includes polybutadiene rubber and styrene-butadiene rubber.

4. The elastomeric composition of claim 1 wherein said silicon-hydride containing polysiloxane is represented by the general formula

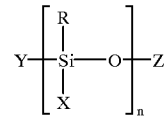

wherein
n represents an integer greater than 1;
X represents H or R', with the proviso that at least one X is H;
R and R' each represents an organic substituent comprising 1 to 20 carbon atoms; and
Y and Z each represents a silicon-containing terminating end group.

5. The elastomeric composition of claim 1 wherein said silicon-hydride containing polysiloxane is an alkyl hydrogen polysiloxane of the formula

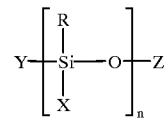

wherein
n represents an integer greater than 1;
X represents H;
R represents a $C_1$–$C_{20}$ alkyl group; and
Y and Z each represents a silicon-containing terminating end group.

6. The elastomeric composition of claim 1 wherein said silicon-hydride containing polysiloxane is a methyl hydrogen polysiloxane of the formula

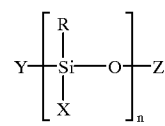

wherein
n represents an integer between about 30 to about 100;
X represents H;
R represents methyl;
Y represents $(CH_3)_3SiO$—; and
Z represents —$Si(CH_3)_3$.

7. The elastomeric composition of claim 1 wherein said barium sulfate particles have a median particle size of approximately 0.1 to 10 microns.

8. The elastomeric composition of claim 1 wherein said barium sulfate particles have a median particle size of approximately 1 micron.

9. A tire having a part thereof formed of a rubber composition comprising:

rubber;

a surface treated barium sulfate product dispersed in said rubber, said surface treated barium sulfate product including a plurality of barium sulfate particles having surfaces and a reaction product of barium sulfate and silicon-hydride containing polysiloxane integrally located on the surfaces of the barium sulfate particles.

10. The tire of claim 9, wherein said part comprises a tread.

11. The tire of claim 9, wherein said rubber includes at least one rubber selected from the group consisting of polyisoprene (natural rubber), polybutadiene, polychloroprene, polyisobutylene, styrene-butadiene rubber, acrylonitrile-butadiene, terpolymers of ethylene/propylene/non-conjugated dienes (EPDM), ethylene-vinylacetate copolymer, ethylene-propylene, chlorobutadiene, chlorinated polyethylene, chlorosulfonated polyethylene and ethylene-acrylate copolymer.

12. The tire of claim 9, wherein said rubber comprises polybutadiene rubber and styrene-butadiene rubber.

13. The tire of claim 9, wherein said silicon-hydride containing polysiloxane is represented by the general formula

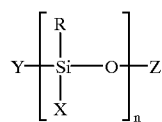

wherein n represents an integer greater than 1;

X represents H or R', with the proviso that at least one X is H;

R and R' each represents an organic substituent comprising 1 to 20 carbon atoms; and Y and Z each represents a silicon-containing terminating end group.

14. The tire of claim 9, wherein said silicon-hydride containing polysiloxane is a methyl hydrogen polysiloxane of the formula

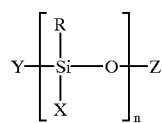

wherein n represents an integer of about 30 to about 100;

X represents H;

R represents methyl;

Y represents $(CH_3)_3SiO—$; and

Z represents $—Si(CH_3)_3$.

15. The tire of claim 9, comprising a conjugated diene rubber or copolymer of a conjugated diene rubber, sulfur, curing accelerator, antiozonant, wax, fatty acid, and metal oxide.

16. A method for making an elastomeric composition, comprising the steps of:

a) providing a quantity of barium sulfate particles having surfaces;

b) surface treating said barium sulfate particles by mixing silicon-hydride containing polysiloxane with said barium sulfate particles in an amount of from about 0.1% to about 2.0% by weight based on the weight of said barium sulfate particles in order to provide a reaction product of said polysiloxane and the barium sulfate on the surface of the barium sulfate particles, wherein said silicon-hydride containing polysiloxane consists essentially of linear silicon-hydride containing polysiloxanes;

c) dispersing the surface treated barium sulfate particles in a vulcanizable elastomeric composition; and d) curing the vulcanizable elastomeric composition.

17. The method of claim 16, wherein said barium sulfate particles have a median particle size of approximately 0.1 to 10 microns, and said silicon-hydride containing polysiloxane is an alkyl hydrogen polysiloxane of the formula

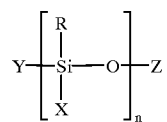

wherein n represents an integer greater than 1;

X represents H;

R represents a $C_1–C_{20}$ alkyl group; and

Y and Z each represents a silicon-containing terminating end group.

18. The method of claim 16 wherein said silicon-hydride containing polysiloxane is a methyl hydrogen polysiloxane of the formula

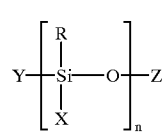

wherein n represents an integer of about 30–100;

X represents H;

R represents methyl;

Y represents $(CH_3)_3SiO—$; and

Z represents $—Si(CH_3)_3$.

* * * * *